United States Patent
Karlsson et al.

(10) Patent No.: US 7,058,402 B2
(45) Date of Patent: Jun. 6, 2006

(54) SUBSCRIBERS DATABASE PROOFING USING A CHECKSUM IN A TELECOMMUNICATIONS SYSTEM

(75) Inventors: Bernt Karlsson, Sollentuna (SE); Rolf Elis Gustaf Hansson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 09/864,468

(22) Filed: May 23, 2001

(65) Prior Publication Data

US 2002/0177439 A1    Nov. 28, 2002

(51) Int. Cl.
- H04M 1/66  (2006.01)
- H04M 1/00  (2006.01)
- H04Q 7/20  (2006.01)
- H04K 1/00  (2006.01)
- H04B 1/38  (2006.01)

(52) U.S. Cl. ............... 455/433; 455/410; 455/411; 455/435.1; 455/550.1; 455/560; 380/247

(58) Field of Classification Search ......... 455/433, 455/435.1, 436, 437–440, 442, 552.1, 456.1–456.6, 455/445, 435.2, 435.3, 550.1, 560–561, 404.2, 455/410–411, 457; 380/247–248, 255, 258, 380/270; 709/227–228, 310, 245–246; 714/100, 714/1–21, 48, 41; 713/100, 161–162, 168, 713/170–171

See application file for complete search history.

(56) References Cited

U.S. PATENT DOCUMENTS 3,974,574 A * 8/1976 Van Vliet et al. ............ 34/585

4,142,243 A * 2/1979 Bishop et al. ................ 714/37
4,843,633 A * 6/1989 Menich et al. ............ 455/422.1

(Continued)

FOREIGN PATENT DOCUMENTS

WO    WO 99/17200    4/1999

OTHER PUBLICATIONS

Mouly, M. et al. "The GSM System". XP 002047768. GSM System for Mobile Communications. pp. 466-477.

(Continued)

*Primary Examiner*—Charles N Appah
*Assistant Examiner*—Meless Zewdu
(74) *Attorney, Agent, or Firm*—Roger Burleigh

(57) ABSTRACT

The present invention is a method and system for updating location information of mobile stations. A mobile station moves from an area controlled by a first mobile services switching center (MSC) to an area controlled by a second MSC. The mobile station then registers with the second MSC, and, in response, the mobile station is added to a second MSC database. The second MSC recalculates a second MSC checksum to include the newly registered mobile station. Next, the HLR sends an HLR checksum to the second MSC. The second MSC compares the HLR checksum and the second MSC checksum. If the checksums are equal, then the second MSC sends the location registration signal to the mobile station. If the checksums are unequal, then the second MSC sends an error signal to the HLR, and also sets the second MSC database equal to a previous correct database. Next, the HLR sends all logged erasures to the second MSC. The second MSC then appropriately subtracts and adds each erased and newly registered mobile station to the database of the second MSC and recalculates the second MSC checksum until both checksums are equal.

2 Claims, 6 Drawing Sheets

U.S. PATENT DOCUMENTS

| | | | | |
|---|---|---|---|---|
| 5,572,528 | A | | 11/1996 | Shuen .................... 370/85.13 |
| 5,594,942 | A | | 1/1997 | Antic et al. ................ 455/33.1 |
| 5,649,089 | A | | 7/1997 | Kilner .................... 395/182.4 |
| 5,765,172 | A | | 6/1998 | Fox ............................ 707/204 |
| 5,898,681 | A | | 4/1999 | Dutta ........................ 370/229 |
| 5,913,170 | A | | 6/1999 | Wortham .................... 455/457 |
| 5,970,144 | A | * | 10/1999 | Chan et al. ................ 380/247 |
| 5,974,574 | A | * | 10/1999 | Lennie et al. ................ 714/52 |
| 5,978,805 | A | | 11/1999 | Carson ........................ 707/10 |
| 6,088,451 | A | * | 7/2000 | He et al. .................... 713/201 |
| 6,128,389 | A | * | 10/2000 | Chan et al. ................ 380/247 |
| 6,181,937 | B1 | * | 1/2001 | Joensuu ...................... 455/433 |
| 6,374,264 | B1 | * | 4/2002 | Bohannon et al. .......... 707/202 |
| 6,434,364 | B1 | * | 8/2002 | O'Riordain .............. 455/67.11 |

OTHER PUBLICATIONS

Roberti, V., Standard Search Report completed on Dec. 20, 2001 in connection with U.S. Appl. No. 09/864,468, filed May 23, 2001.

* cited by examiner

SUBSCRIBERS DATABASE PROOFING USING A CHECKSUM IN A TELECOMMUNICATIONS SYSTEM

TECHNICAL FIELD

The present invention relates in general to a telecommunications system, and more particularly to a checksum procedure for reducing the amount of invalid location information of mobile stations.

BACKGROUND OF THE INVENTION

Mobile communications technology has enjoyed substantial growth and advancement over the past decade. Such advancements have led to a widespread use of mobile stations that may be used in one or several cells by customers that frequently change position. When a terminating call attempt is placed to a mobile station (MS), the call is routed to the mobile station based on location information stored within a home location register (HLR). If the HLR is storing incorrect location information, the terminating call attempt is routed to an incorrect mobile services switching center (MSC). The incorrect routing causes the terminating call to not be received at the mobile station. The HLR may store incorrect location information when, for example, a location registration (LR) acknowledgment signal or a location erasure (LE) signal is not received by an MSC. Unsatisfactory link quality, congestion, signal loss, or a large amount of location erasures, among other things, may cause LE and LR acknowledgment signals to not be received by the MSC.

FIG. 2 illustrates the current LR signaling sequence, which cannot detect or correct erroneous location information at the HLR. A mobile station 10 first leaves an area controlled by a first MSC 30 and enters a new cell controlled by a second MSC 50. Upon entering the new cell, at step s200, the mobile station 10 makes a location registration request 21 with the second MSC 50. At step s202, the second MSC 50, in response to the LR request 21, makes a subscriber data request to the HLR 40. The subscriber data, in the HLR 40, associated with a particular mobile station 10 includes, among other things, the location information of that particular mobile station 10. The location information includes the identity of the MSC that controls the area in which the mobile station 10 is located. At step s204, the HLR 40 sends the subscriber data back to the second MSC 50. In response to receiving the subscriber data, at step s206, the second MSC 50 sends an authentication request to the mobile station 10 to confirm the identity of the mobile station 10. In return, the mobile station 10 transmits an authentication response to the second MSC 50 at step s208. At step s210, the second MSC 50 sends an LR to the HLR 40. The HLR 40, at step s212, sends an LR acknowledgment signal to the second MSC 50. If this signal is not received at the second MSC 50, then the LR attempt of the mobile station 10 fails and the second MSC 50 does not register the mobile station 10 in the second MSC 50 database. Assuming the second MSC 50 receives the LR acknowledgment signal, the second MSC 50, at step s214, sends the LR acknowledgment signal to the mobile station 10, which notifies the mobile station 10 that the LR is complete and successful.

When the LR acknowledgment signals are lost, the current solution is for the mobile station 10 to assume the location registration request failed and make a new location registration request every six seconds until the mobile station 10 receives the LR acknowledgment signal. After the HLR 40 sends the LR acknowledgment signal, at step s216, the HLR 40 sends a location erasure signal to the first MSC 30, which, for several reasons may not be received by the first MSC 30. To correct for the signal loss of an LE signal, the HLR 40 buffers and resends the LE signal up to five times, with up to thirty minutes between each attempt. When the first MSC 30 receives the LE signal, the subscriber data of the mobile station 10 associated with the LE signal is erased from the database of the first MSC 30. Once the subscriber data of the mobile station 10 is erased, at step s218, the first MSC 30 sends an LE acknowledgment signal to the HLR 40, which notifies the HLR 40 that the subscriber data of the mobile station 10 has been erased from the first MSC 30 database.

An example of an exemplary manner in which an HLR may store incorrect location information, with reference to the prior art technique shown in FIG. 1, begins with a mobile station 10 making a location registration request 20 to a first MSC 30. The HLR 40 updates the location information in the subscriber data associated with the mobile station 10 by replacing a previous MSC identity with the identity of the first MSC 30. The HLR 40 also sends a copy of the updated subscriber data to the first MSC 30. Then the mobile station 10 moves to a second cell controlled by a second MSC 50. Upon moving to the second cell, the mobile station 10 makes a location registration request 21 with the second MSC 50. The second MSC 50 informs the HLR 40 to update the subscriber data corresponding to the mobile station 10. The HLR 40 then replaces the location information, which indicates the identity of the first MSC 30 with the identity of the second MSC 50. The HLR 40 sends an LE signal to the first MSC 30, which, for example, due to unsatisfactory link quality, is not received. Therefore, the first MSC 30 does not remove the subscriber data associated with the mobile station 10. After the LE signal is lost, the mobile station 10 moves back to the first MSC 30. The mobile station 10 next makes a location registration request 22 with the first MSC 30. Because the first MSC 30 did not subtract the subscriber data associated with the mobile station 10, the first MSC 30 does not inform the HLR 40 that the mobile station 10 is now located in the area controlled by the first MSC 30. Consequently, the HLR 40 still has the identity of the second MSC 50 stored in the location information of the subscriber data for the mobile station 10. If the mobile station 10 now receives a terminating call attempt, the call is routed to the second MSC 50, which cannot contact the mobile station 10. Therefore, the terminating call attempt fails because the HLR 40 contains incorrect location information.

Despite the current solutions, some or all of the repetitive LE signals may be lost, which leads to the HLR containing incorrect information. Extenuating circumstances, such as a high number of erasures, cause the loss of all repetitive signals. The re-attempt buffer of the HLR has a size limit and may be congested, therefore causing all signals in excess of the limit to be lost. Also, by sending repeat LR requests from a mobile station, and executing the entire location registration procedure again, valuable time and capacity are consumed. A mobile station continues to make location registration re-attempts until successful, consequently allowing re-attempts to be sent several numbers of times. The central processor, air interface, and signaling links may get congested by sending an unlimited number of re-attempts. Therefore, there is a need to eliminate the invalid location information of mobile stations without congesting the system as in the current state-of-the-art.

SUMMARY OF THE INVENTION

The present invention relates to a method and system for updating and validating location information of a mobile station by using a checksum procedure. An exemplary procedure begins by adding the mobile station to a second MSC database in response to the mobile station registering with the second MSC. The second MSC recalculates a second MSC checksum to include the newly registered mobile station. Next, the HLR sends an HLR checksum to the second MSC. The second MSC compares the HLR checksum and the second MSC checksum. If the checksums are equal, then the second MSC sends the location registration signal to the mobile station. If the checksums are unequal, then the second MSC sends an error signal and checksum identity to the HLR, and also sets the second MSC database equal to a previous correct database. Next, the HLR sends all logged erasures performed after the point in time when both checksums are correct until the error signal is sent to the second MSC. The second MSC then appropriately removes each erased and adds newly registered mobile station to the database of the second MSC and recalculates the second MSC checksum until both checksums are equal. The checksum identity in both HLR and MSC is stepped each time the checksum is recalculated. A suitable checksum calculation method could be a Cyclic Redundant Check (CRC); the CRC may be based upon a part of the mobile's identity IMSI. The checksum granularity (i.e., intervals as well as deviation) needs to be changeable due to loadability reasons. Intervals could be from every LR and up to every 100 LR. The deviation (number of lost MS) could be from one MS up to about 100 MSs. The changeable interval and deviation should be chosen such that the system is using an acceptable part of its capacity for this task.

BRIEF DESCRIPTION OF THE DRAWINGS

A more complete understanding of the method and system of the present invention may be obtained by reference to the following Detailed Description when taken in conjunction with the accompanying Drawings wherein.

DETAILED DESCRIPTION OF THE PREFERRED EXEMPLARY EMBODIMENTS

Figure 1:
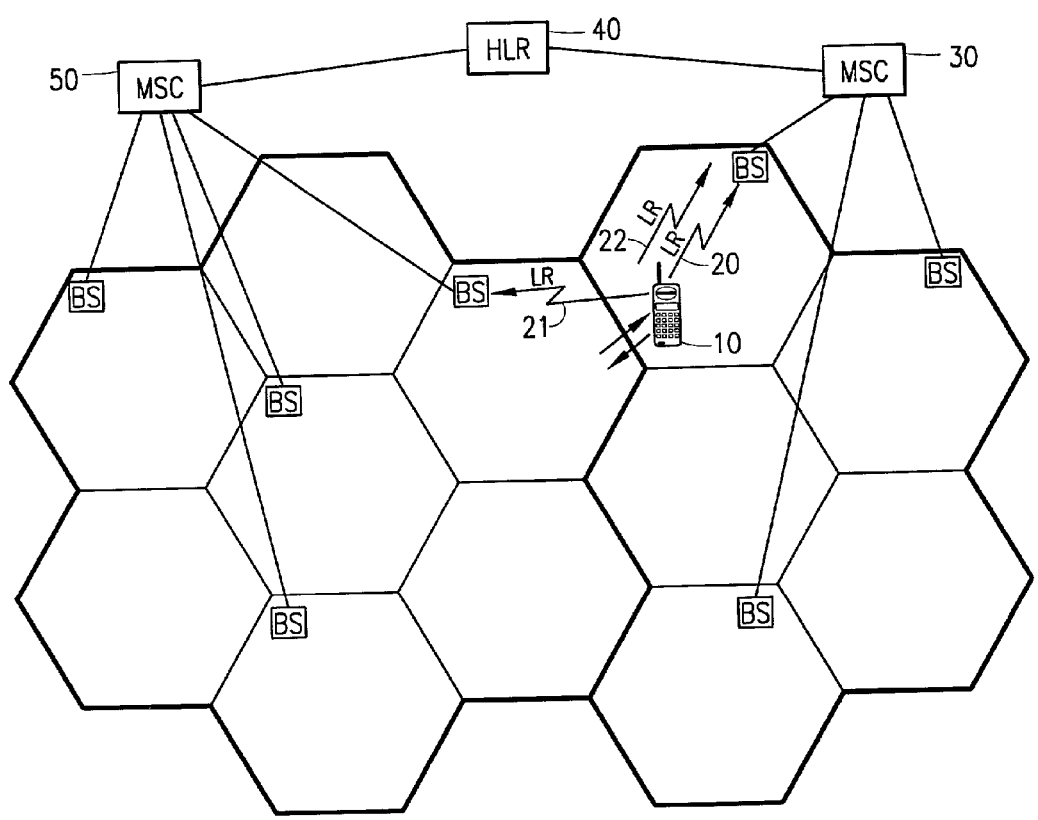
FIG. 1 is a diagram of an exemplary telecommunication system.
Figure 2:
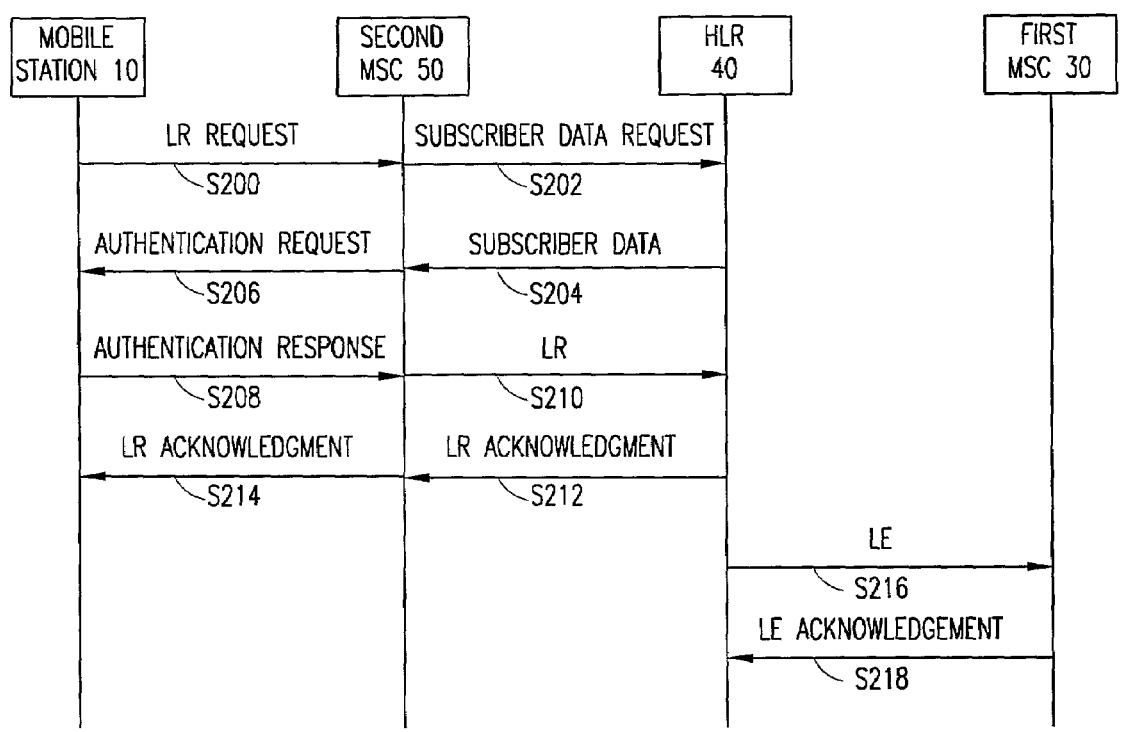
FIG. 2 is a prior art flow diagram of the signaling sequence for location registration.
Figure 3:
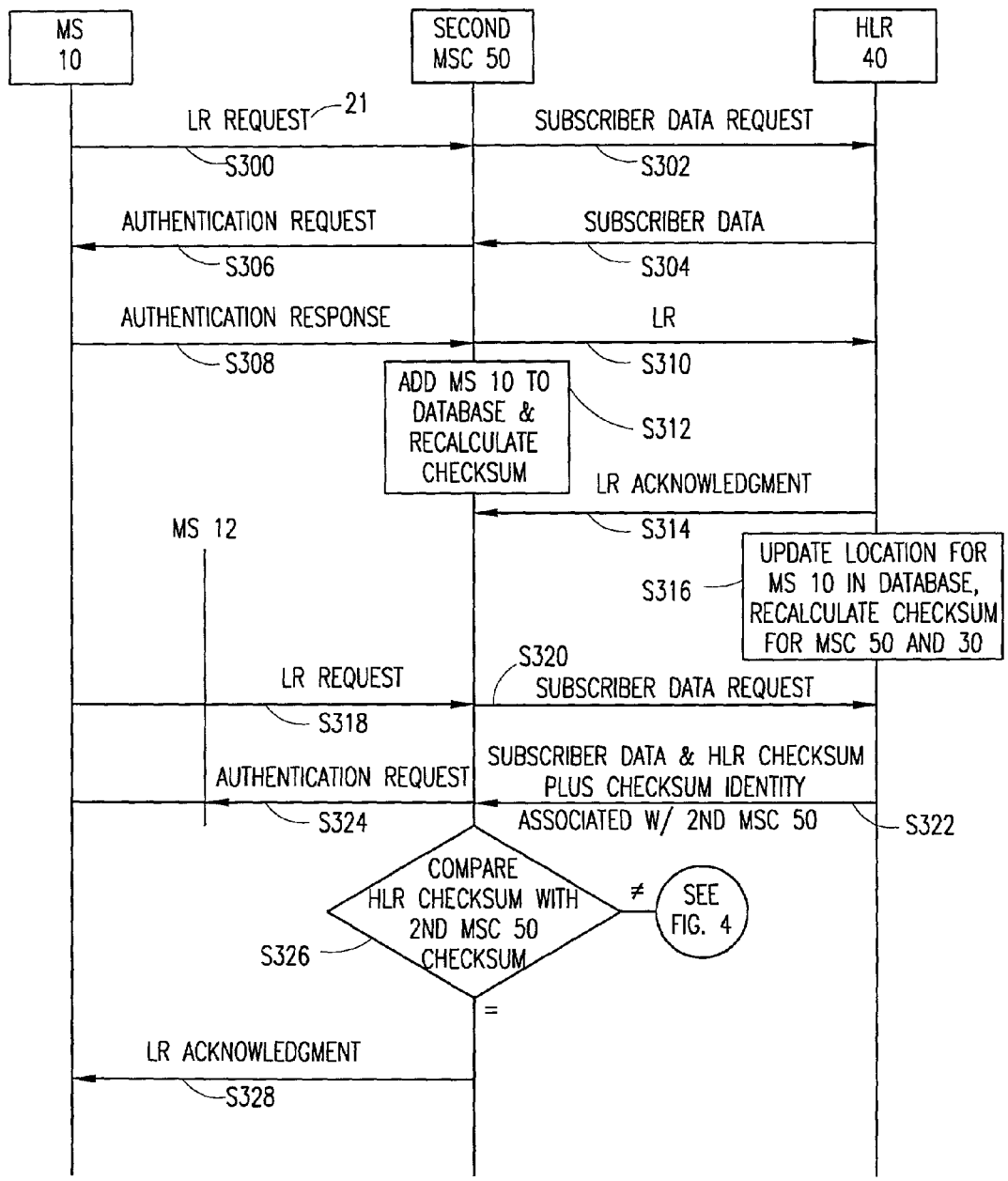
FIG. 3 is a flow diagram of the checksum method in accordance with an embodiment of the present invention for a second MSC.

FIG. 3 is a flow diagram of an exemplary checksum method for a second MSC 50 in accordance with an embodiment of the present invention. The general usage of a checksum is as an error detection scheme in which a transmitted message is accompanied by a numerical value based on the number of set bits in the transmitted message. The receiver of the transmitted message and numerical value applies the same formula to the transmitted message and determines if the transmitted numerical value is equal to the numerical value calculated by the receiver. If the two values are equal, then the receiver can assume the transmitted message was received correctly. However, if the values are unequal, the receiver can assume the transmitted message was incorrectly received. In an exemplary embodiment of the present invention, a checksum scheme is used to validate the consistency between a mobile station's location information in the HLR 40 database and the mobile station's present MSC location. This is achieved by a HLR specific checksum parameter in the MSC that is updated with the identity of the MS 10 making LR in the a second MSC 50 as well when leaving the first MSC 30. The MSC comprises o checksum parameter per HLR. The HLR 40 comprises several checksum parameters as well, one for each MSC. The checksum parameter in HLR 40 for MSC 50 is recalculated with the identity of the MS 10 included. The checksum parameter in HLR 40 for MSC 30 is recalculated with the identity of the MS 10 excluded, due to the updating of the MSC location identifier of the MS 10 subscriber data in the HLR 40 database. Both the checksum parameter for HLR 40 in the second MSC 50 and the later checksum parameter for HLR 40 in the first MSC 30 are recalculated. The checksum in the HLR 40 for the first MSC 30 is sent to the first MSC 30 and compared with the recalculated checksum that is in the first MSC 30. The checksum in the HLR 40 for the second MSC 50 is sent to the second MSC 50 and compared with recalculated checksum that is in the second MSC 50.

In step s300, a mobile station 10 has moved from an area controlled by a first MSC 30 to an area controlled by a second MSC 50, and therefore makes a location registration request 21 with the second MSC 50. The second MSC 50 receives the LR request 20 and, in step s302, sends a subscriber data request to the HLR 40. In step s304, the HLR 40 sends the subscriber data back to the second MSC 50. The second MSC 50, after receiving the subscriber data, transmits an authentication request to the mobile station 10 in step s306. The mobile station 10, at step s308, sends an authentication response to the second MSC 50. At step s310, the second MSC 50 sends an LR to the HLR 40. At this point, the HLR 40 updates the subscriber data to include the identity of the second MSC 50. By updating the subscriber data, incoming calls are properly routed to the mobile station 10 via the second MSC 50. At step s312, the second MSC 50 adds the mobile station 10 to the second MSC database, and then recalculates the second MSC checksum to include the mobile station 10. At step s314, the HLR 40 transmits an LR acknowledgment to the second MSC 50. This acknowledgment notifies the second MSC 50 that the location registration process has been completed successfully, and that the HLR 40 has updated the subscriber data to include the identity of the second MSC 50. After transmitting the LR acknowledgment, the HLR 40 updates the MSC location entity for the mobile station 10 in the HLR checksum parameter where the MSC 50 identity replaces the MSC 30 identity at step s316. The HLR then recalculates the HLR checksum for MSC 50 to include the mobile station 10 identity and recalculates the HLR checksum for MSC 30 to exclude the mobile station 10. At step s318, a second mobile station 12 then enters the area controlled by the second MSC 50 and makes an LR request. When the second MSC 50 receives the LR request, the second MSC 50 sends a subscriber data request to the HLR 40 for the second mobile station 12 at step s320. At step s322, the HLR 40 sends the subscriber data for the second mobile station 12 and the recalculated HLR checksum plus the incremented checksum identity associated with the second MSC 50 back to the second MSC 50. The second MSC 50, at step s324, transmits an authentication request to the second mobile station 12. Upon receipt of the HLR checksum, the second MSC 50 compares the recalculated checksum with the checksum sent from the HLR at step s326. The checksum version for comparison is identified by the received checksum identity. If the checksums match, which should be the normal case, then the second MSC 50 has correctly registered the mobile station 10. Matching checksums also indicate that the HLR 40 has successfully updated the location information to indicate the correct MSC for routing incoming calls. Now when an incoming call is placed to the mobile station 10, it is routed correctly and the call is not lost. After the second MSC 50 determines the checksums are equal, the second MSC 50 sends an LR acknowledgment to the mobile station 10 at step s328.

Figure 4:
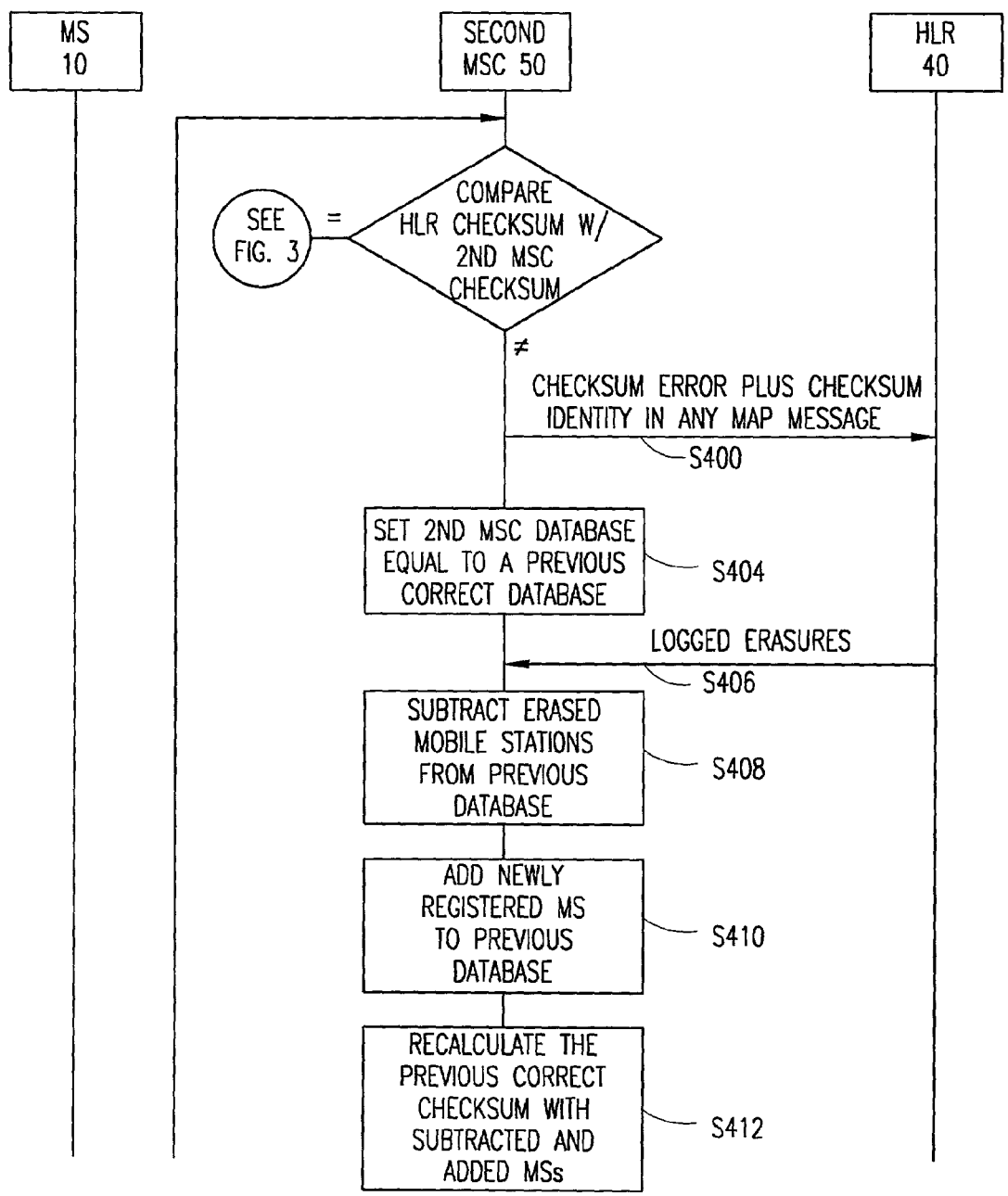
FIG. 4 is a flow diagram of the checksum error method in accordance with an embodiment of the present invention for a second MSC.

FIG. 4 is a flowchart depicting the exemplary procedures for when the second MSC 50 checksum and the received HLR 40 checksum are unequal. When the checksums are unequal, an acknowledgment signal or an erasure signal has been lost between the HLR 40 and the second MSC 50. If the second MSC 50 does not receive the acknowledgment signal, then the mobile station 10 is not registered with the second MSC 50, and any incoming calls for the mobile station 10 will be lost. If an erasure signal for a mobile station is lost, then calls are being routed through the second MSC 50, when, in fact, the mobile station has moved to another area controlled by another MSC. After the second MSC 50 determines the checksums are unequal, the second MSC 50 sends a checksum negative acknowledgment indication and checksum identity in the next MAP message to the HLR 40 at step s400. This indicates to the HLR 40 that an error in signaling has occurred and either the mobile station 10 is not properly registered at the second MSC 50, or that one or more mobile stations were not properly erased from the second MSC 50 database. Examples of possible MAP messages are Subscriber Data Request, LR, and Erasure Acknowledge. At step s404, the second MSC 50 sets the second MSC 50 database equal to a previous database. Then, at step s406, the HLR 40 sends all logged erasures from a point in time identified by a checksum identify received together with the checksum error information, until the previous database was determined to be correct. The second MSC 50 subtracts each erased MS from the previous database at step s408, and adds each MS that has registered after the previous checksum to the previous database at step s410. The second MSC 50 recalculates the checksum and compares it with the HLR 40 checksum. The erased mobile stations and newly registered mobile stations are appropriately subtracted and added to the checksum in steps S408 and S410 until the HLR 40 checksum and the second MSC 50 checksum are equal. The MSC 50 recalculates the previous correct checksum with the subtracted and added MSs at step S412.

Figure 5:
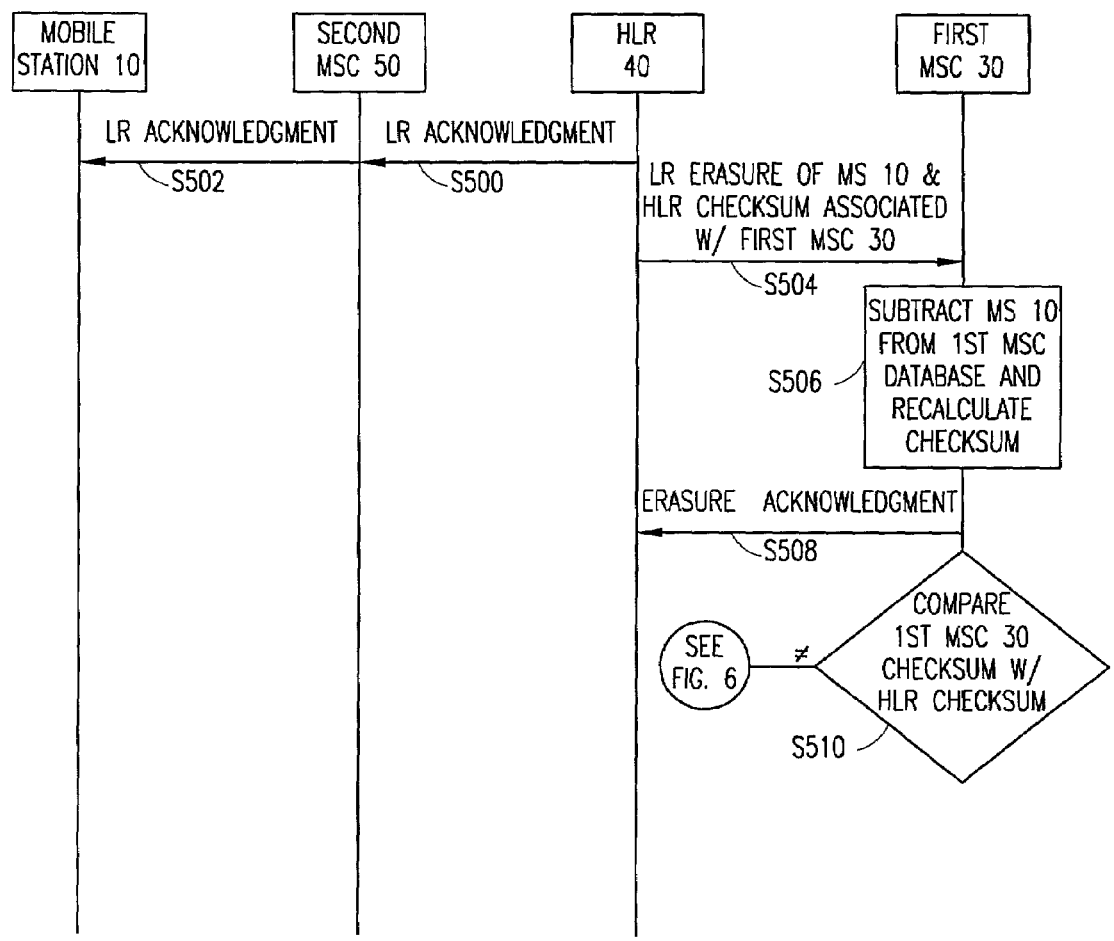
FIG. 5 is a flow diagram of the checksum method in accordance with an embodiment of the present invention for a first MSC.

FIG. 5 illustrates a flow chart of the checksum method for the first MSC 30 in accordance with an embodiment of the present invention. A mobile station 10 moves from an area controlled by a first MSC 30 to an area controlled by a second MSC 50. The mobile station 10 then goes through the process of making a location registration with the second MSC 50 as described in FIG. 3 in steps s300–s310. In response to receiving the LR signal from the second MSC 50, the HLR 40 sends an LR acknowledgment back to the second MSC 50 at step s500. At step s502, the second MSC 50 sends an LR acknowledgment to the mobile station 10. Next, the HLR 40 sends to the first MSC 30 the LR erasure of the mobile station 10 along with the HLR checksum and checksum identity associated with the first MSC 30 at step s504. At step s506, the first MSC 30 subtracts the mobile station 10 from the first MSC 30 database. The first MSC 30 then recalculates the first MSC 30 checksum to account for the subtracted mobile station 10. After subtracting the mobile station 10 from the first MSC 30 database, the first MSC 30 sends an erasure acknowledgment to the HLR 40 at step s508. The first MSC 30, at step s510, compares the calculated checksum by the first MSC 30 and the received HLR checksum. If the checksums are equal, then the MSC 30 recognizes that the erasure and LR procedures have taken place successfully both in the HLR 40 and the first MSC 30 up to the point in time when this erasure is performed. Equal checksums also indicate that the location information of the mobile station 10 is correct in HLR 40, which signifies that the incoming calls to the mobile station 10 will be routed correctly.

Figure 6:
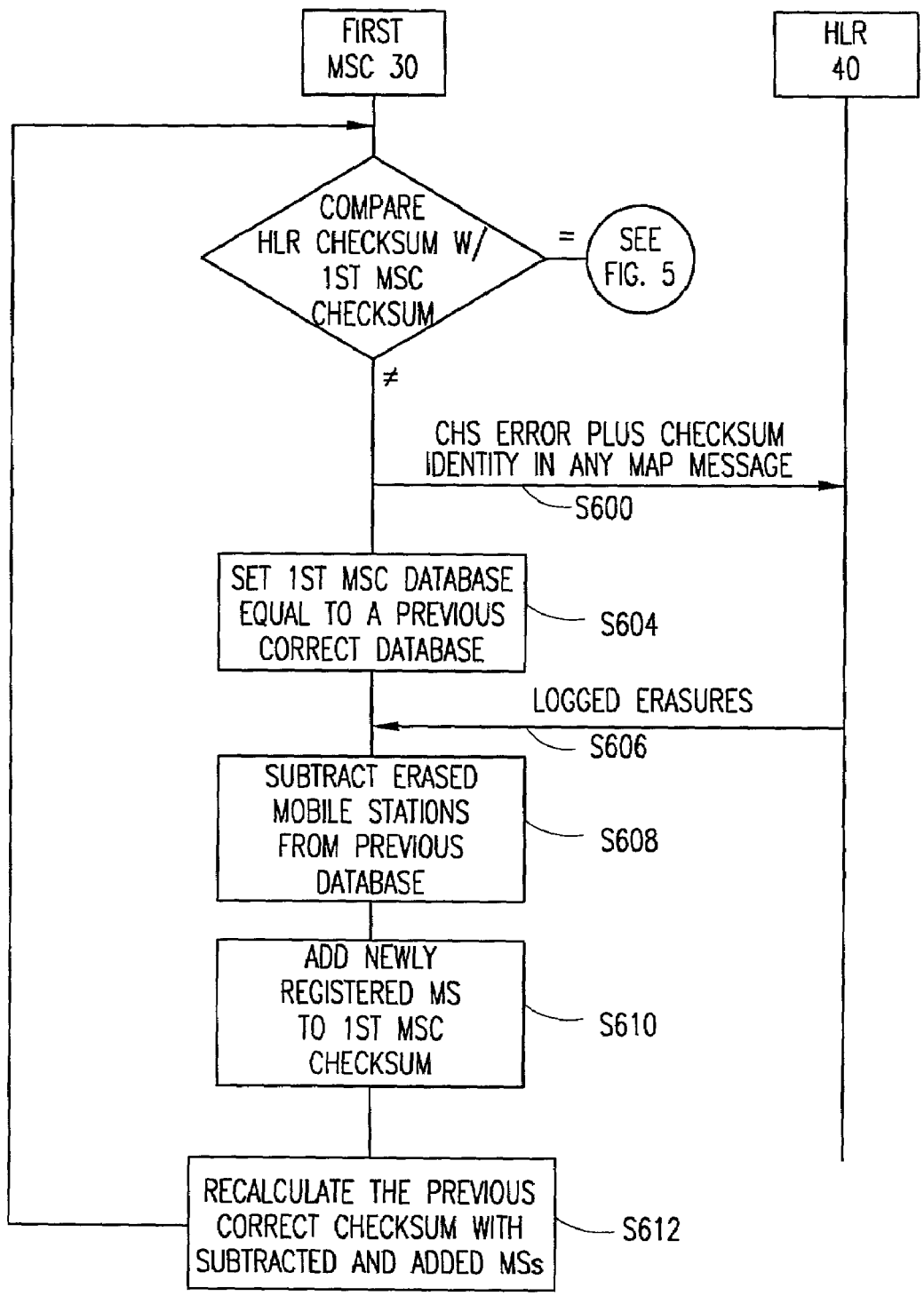
FIG. 6 is a flow diagram of the checksum error method in accordance with an embodiment of the present invention for a first MSC.

FIG. 6 illustrates a flow diagram for correcting the first MSC 30 checksum when the first MSC 30 checksum and the HLR 40 checksum are unequal. After determining the checksums are unequal, the first MSC 30 sends a CHS error message to the HLR 40 at step s600. At step s604, the first MSC 30 sets the first MSC 30 database equal to a previous first MSC 30 database. Then, at step s606, the HLR 40 transmits all logged erasures since the previous checksum back to the first MSC 30. Upon receiving the logged erasures, the first MSC 30 subtracts each erased MS from the first MSC 30 database at step s608, and adds each MS that has registered after the previous checksum to the database until the checksums are equal in s610. The MSC 30 then may recalculate the previous correct checksum with the subtracted and added MSs at Step S612.

The previous description is of a preferred embodiment for implementing the invention, and the scope of the invention should not necessarily be limited by this description. The scope of the present invention is instead defined by the following claims.

What is claimed is:

1. A method in a first mobile services switching center for updating location information of a mobile station, said method comprising:

sending a home location register checksum from a home location register to said first mobile services switching center;

subtracting said mobile station from the first mobile services switching center database;

recalculating the first mobile services switching center checksum to account for the subtracted mobile station;

sending an erasure acknowledge signal from said first mobile services switching center to said home location register; and comparing said first mobile services switching center checksum to said home location register checksum.

2. The method of claim 1, wherein said step of comparing said first mobile services switching center checksum to said home location register checksum further comprises the additional steps of:

sending a negative acknowledge signal from said first mobile services switching center to said home location register when said home location register checksum and said first mobile services switching center checksum are not equal;

setting said first mobile services switching center database equal to a previous correct database when said home location register checksum and said first mobile services switching center checksum are not equal;

sending all logged mobile stations that have been erased from said home location register to said first mobile services switching center after receiving said error signal at said home location register from said first mobile services switching center;

subtracting each erased mobile station and adding each newly registered mobile station to said previous correct database;

appropriately adding and subtracting each of said mobile stations until said home location register checksum and said first mobile services switching center checksum are equal;

erasing the mobile stations that are resent in said logged erasures; and stopping said sending of a negative acknowledge signal from said first mobile services switching center to said home location register when said first mobile services switching center checksum and said home location register checksum are equal.

* * * * *

UNITED STATES PATENT AND TRADEMARK OFFICE
CERTIFICATE OF CORRECTION

| | | |
|---|---|---|
| PATENT NO. | : 7,058,402 B2 | Page 1 of 1 |
| APPLICATION NO. | : 09/864468 | |
| DATED | : June 6, 2006 | |
| INVENTOR(S) | : Karlsson et al. | |

It is certified that error appears in the above-identified patent and that said Letters Patent is hereby corrected as shown below:

On Title Page 2, item (56), under "U.S. PATENT DOCUMENTS", in Column 1, Line 3, delete "395/182.4" and insert -- 395/182.04 --, therefor.

Column 4, Line 16, delete "o" and insert -- a --, therefor.

Signed and Sealed this

Eighteenth Day of December, 2007

JON W. DUDAS
*Director of the United States Patent and Trademark Office*